A. BAIN.
FISHHOOK.
APPLICATION FILED MAR. 22, 1920.

1,357,678. Patented Nov. 2, 1920.

Inventor
Addison Bain

UNITED STATES PATENT OFFICE.

ADDISON BAIN, OF MARION, OHIO.

FISHHOOK.

1,357,678.    Specification of Letters Patent.    Patented Nov. 2, 1920.

Application filed March 22, 1920. Serial No. 367,689.

*To all whom it may concern:*

Be it known that I, ADDISON BAIN, a citizen of the United States, residing at 182 Wallace street, Marion, in the county of Marion, State of Ohio, have invented an Improved Fishhook, of which the following is a specification.

This invention has reference to new and useful improvements in devices for catching fish and it has particular reference to a fish hook of novel construction intended for the use of anglers for line fishing.

The main object of the invention is to provide an improved fish hook, which when properly baited with two worms, shall give the natural appearance of one continuous live worm, and consequently avoid all semblance of a decoy or lure.

A further object is to provide a hook on which the bait is supported at all times in a horizontal position, thereby presenting the bait to the fish in the most convenient position for attack.

A further object is to provide a hook which shall dispense with the necessity of employing a separate sinker, since my improved construction provides the necessary weight for the line as an integral part thereof.

To this end the invention embodies the novel arrangement and details of construction hereinafter shown, described and claimed.

In the accompanying drawings, illustrative of my invention, Figure 1 is an elevation of my improved hook showing the same as it appears when properly attached to a line.

Figure 1:
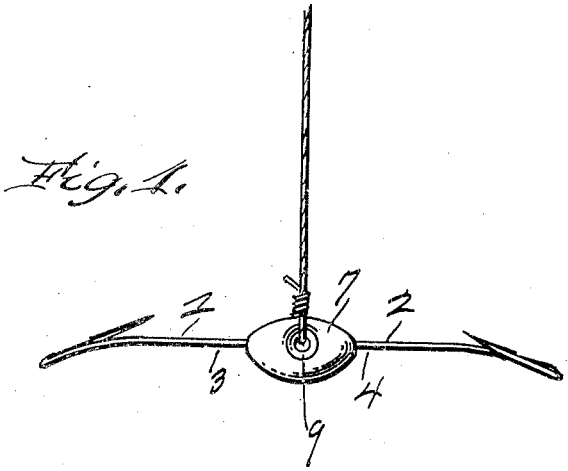
Figure 2:
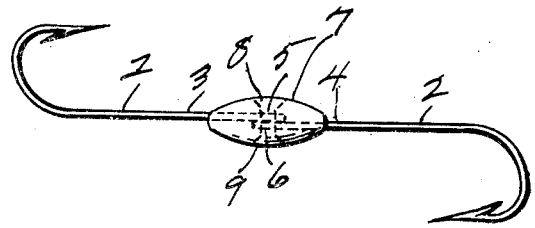
Fig. 2 is a top view of the same.
Figure 3:
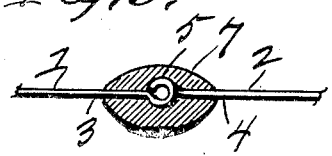
Fig. 3 is a fragmentary sectional elevation showing the inner ends of the shanks of the hooks and their overlapping eyes in full lines, the cast metal block being in section.

Referring to the details, my invention employs oppositely disposed hooks 1 and 2, arranged with their shanks 3 and 4 in substantially a straight line with their respective eyes 5 and 6 overlapping and secured in this position by a solid cast block 7, having a transverse perforation in line with and coincident with the overlapping eyes, the perforation through the block and the overlapping eyes which surround the perforation providing a most effective means for securing the line to the device. To facilitate inserting the line through the eye in the block and to further prevent the line from being cut, the outer ends of the perforation through the block are countersunk as at 8 and 9. The solid cast block has a substantially ovate form as shown, and the preponderance of its mass lies below the horizontal plane through the fastening, thus providing a low center of gravity. It is therefore apparent that by reason of the attachment of the line above the center of gravity, the device will at all times be supported in perfect balance, as shown in Fig. 1.

The invention when constructed as shown and described, provides a simple, inexpensive and effective device for line fishing.

Having described my invention, what I claim and desire to secure by Letters Patent, is:

In a device of the class described, a pair of oppositely arranged hooks having their eyes overlapping, and a cast metal block of substantially ovate form uniting the hooks and surrounding the eyes and having a transverse perforation in line with the eyes to provide means for securing a line to the device, the block being disposed with a preponderance of its mass on one side of the axis of the eyes, substantially as described.

ADDISON BAIN.